(12) United States Patent
Chen

(10) Patent No.: US 11,174,892 B2
(45) Date of Patent: Nov. 16, 2021

(54) SCREW ASSEMBLY HAVING ENHANCED AIRTIGHT EFFECT

(71) Applicant: Wei-Chih Chen, Taichung (TW)

(72) Inventor: Wei-Chih Chen, Taichung (TW)

( * ) Notice: Subject to any disclaimer, the term of this patent is extended or adjusted under 35 U.S.C. 154(b) by 128 days.

(21) Appl. No.: 16/581,890

(22) Filed: Sep. 25, 2019

(65) Prior Publication Data
US 2021/0088072 A1  Mar. 25, 2021

(51) Int. Cl.
F16B 43/00 (2006.01)
F16B 35/00 (2006.01)

(52) U.S. Cl.
CPC ............ *F16B 43/001* (2013.01); *F16B 35/00* (2013.01)

(58) Field of Classification Search
CPC ............................... F16B 43/001; F16B 35/00
USPC ........................................................ 411/371.1
See application file for complete search history.

(56) References Cited

U.S. PATENT DOCUMENTS

| | | | | |
|---|---|---|---|---|
| 1,969,796 A | * | 8/1934 | Hoke | F16B 33/004 411/366.1 |
| 4,518,294 A | * | 5/1985 | Barth | F16B 39/282 411/188 |
| 4,749,321 A | * | 6/1988 | Knohl | F16B 37/14 411/369 |
| 4,820,076 A | * | 4/1989 | Rossigno | B23P 11/00 403/284 |
| 4,820,235 A | * | 4/1989 | Weber | F16B 39/282 411/188 |
| 4,875,818 A | * | 10/1989 | Reinwall | F16B 33/004 411/369 |
| 4,966,512 A | * | 10/1990 | Takaku | F16B 35/048 411/181 |
| 5,304,023 A | * | 4/1994 | Toback | F16B 33/004 411/387.3 |
| 5,338,141 A | * | 8/1994 | Hulsey | F16B 33/008 411/369 |
| 5,622,464 A | * | 4/1997 | Dill | F16B 35/048 411/369 |
| 6,244,807 B1 | * | 6/2001 | Garcia | F16B 33/004 411/369 |
| 8,858,142 B2 | * | 10/2014 | Suzuki | F16B 35/06 411/184 |
| 9,086,088 B2 | * | 7/2015 | Walther | F16B 35/065 |

* cited by examiner

*Primary Examiner* — Gary W Estremsky
(74) *Attorney, Agent, or Firm* — Alan D. Kamrath; Karin L. Williams; Mayer & Williams PC

(57) ABSTRACT

A screw assembly includes a screw and a washer mounted on the screw. The screw includes a screw head, a rotation portion formed on a top of the screw head, and an external thread formed on a bottom of the screw head. The bottom of the screw head is provided with at least one projection and at least one recessed portion. When the external thread is screwed into an article, the washer is compressed between the screw head and the article. The at least one projection and the at least one recessed portion press the washer, and the washer is expanded outward and forms an expansion. The at least one projection and the at least one recessed portion enhance an airtight effect of the washer.

5 Claims, 11 Drawing Sheets

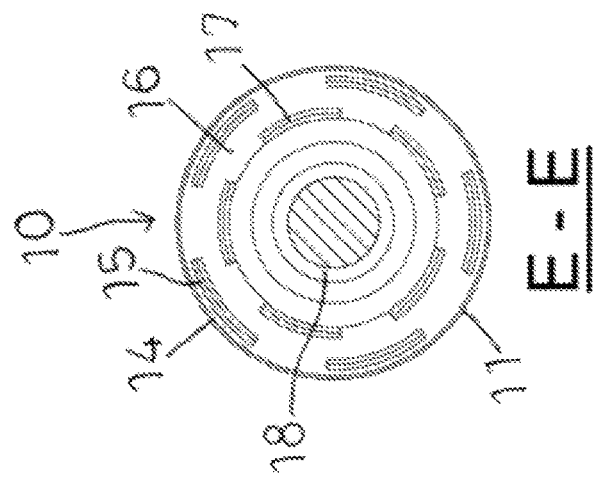
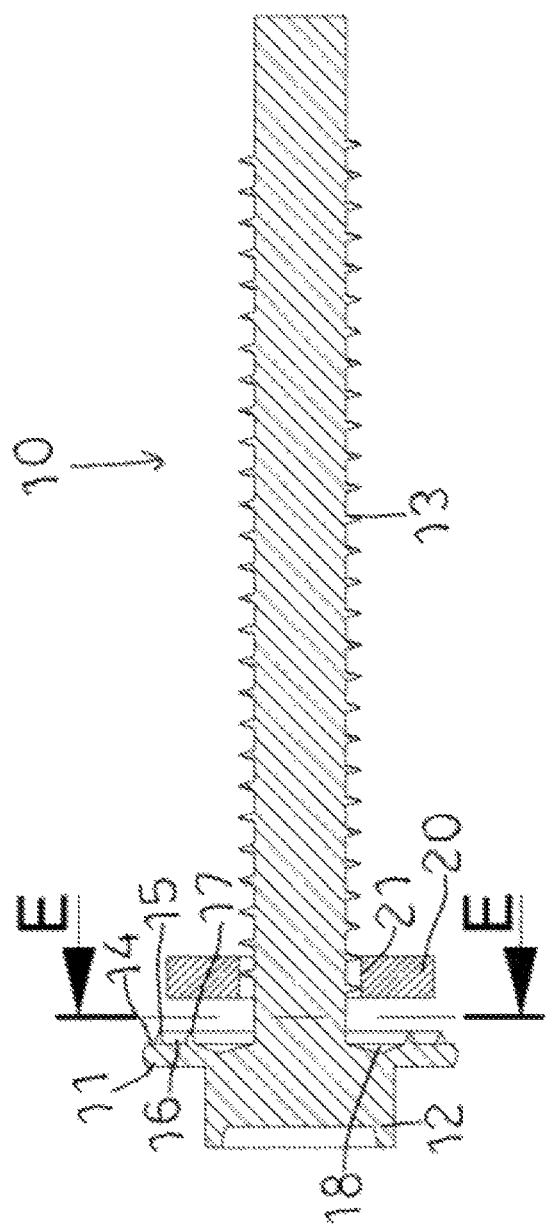

SCREW ASSEMBLY HAVING ENHANCED AIRTIGHT EFFECT

BACKGROUND OF THE INVENTION

1. Field of the Invention

The present invention relates to a fastener and, more particularly, to a screw assembly.

2. Description of the Related Art

A conventional screw assembly in accordance with the prior art shown in FIGS. 1 and 2 comprises a screw 40 and a washer 50 mounted on the screw 10. The screw 40 includes a screw head 41, a rotation portion 42 formed on the top of the screw head 41, and an external thread 43 formed on the bottom of the screw head 41. The bottom of the screw head 41 is provided with a receiving recess 45. A driving tool is mounted on the rotation portion 42 to drive the rotation portion 42 which is driven to rotate the screw 40. The external thread 43 has a distal end provided with a tip 44. The washer 50 has a center provided with a through hole 51 mounted on the external thread 43 of the screw 40. In operation, when the rotation portion 42 is rotated, the screw 40 is rotated, and the external thread 43 is screwed into an article 30. When the screw head 41 touches the washer 50, the washer 50 is compressed between the screw head 41 and the article 30 as shown in FIG. 2. At this time, the washer 50 is received in the receiving recess 45 of the screw head 41. However, the washer 50 is easily deflected from the receiving recess 45 of the screw head 41, such that a gap is defined between the washer 50 and the receiving recess 45 of the screw head 41, thereby decreasing the airtight effect. Thus, ambient air or liquid outside of the screw head 41 easily infiltrates through the washer 50 into the inner face of the article 30.

BRIEF SUMMARY OF THE INVENTION

The primary objective of the present invention is to provide an integrally formed screw assembly having an enhanced airtight effect.

In accordance with the present invention, there is provided a screw assembly comprising a screw and a washer mounted on the screw. The screw includes a screw head, a rotation portion formed on a top of the screw head, and an external thread formed on a bottom of the screw head. The bottom of the screw head is provided with at least one projection and at least one recessed portion. When the external thread is screwed into an article, the washer is compressed between the screw head and the article. The at least one projection and the at least one recessed portion press the washer, and the washer is expanded outward and forms an expansion. The at least one projection and the at least one recessed portion enhance an airtight effect of the washer.

Preferably, the rotation portion of the screw has a hexagonal shape, a plum blossom shape or a circular shape.

Preferably, the at least one projection includes a first projection and a second projection, the first projection is divided into a plurality of first sections, the second projection is divided into a plurality of second sections, and the first sections of the first projection and the second sections of the second projection are arranged at an alternating state.

Preferably, the at least one projection has a successive shape.

Preferably, the at least one projection includes a first projection and a second projection, the first projection is formed on an outer circumference of the bottom of the screw head, and the second projection is formed on an inner circumference of the bottom of the screw head.

Preferably, the washer is made of resilient material.

Preferably, the bottom of the screw head is integrally formed with the at least one projection and the recessed portion.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 11 is a cross-sectional view of the screw assembly as shown in FIG. 9.

FIG. 12 is a cross-sectional view of the screw assembly taken along line E-E as shown in FIG. 11.

DETAILED DESCRIPTION OF THE INVENTION

Figure 1:
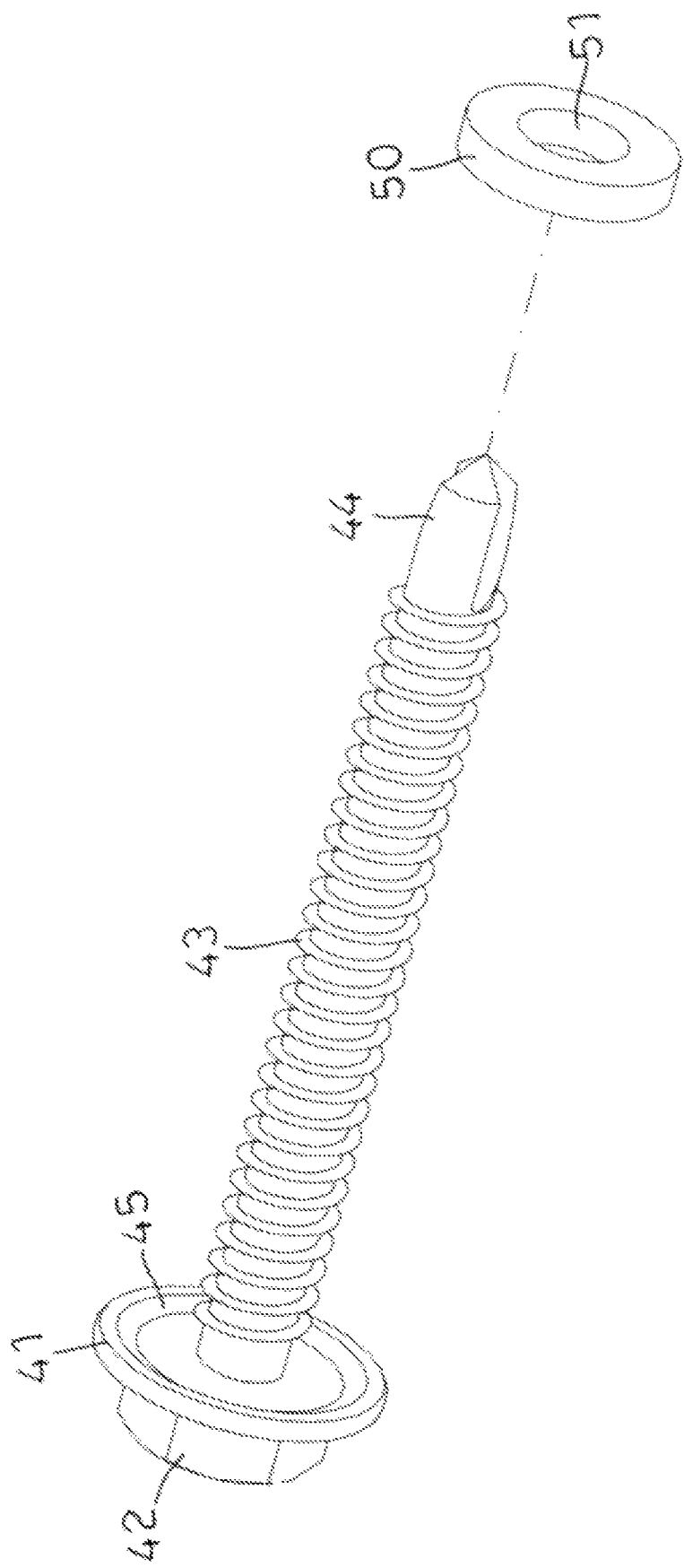
FIG. 1 is an exploded perspective view of a conventional screw assembly in accordance with the prior art.
Figure 2:
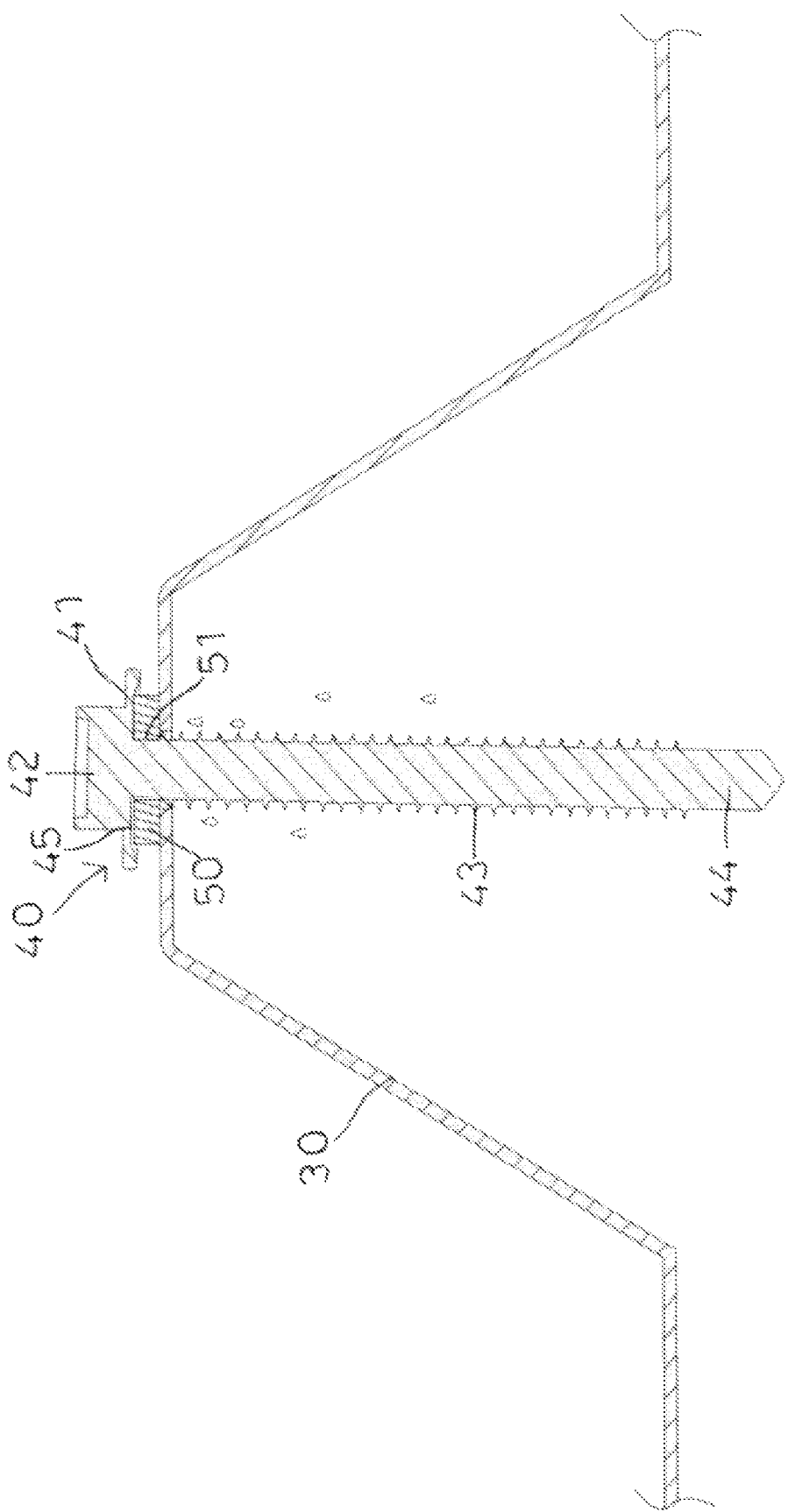
FIG. 2 is a cross-sectional assembly operational view of the conventional screw assembly in accordance with the prior art.
Figure 3:
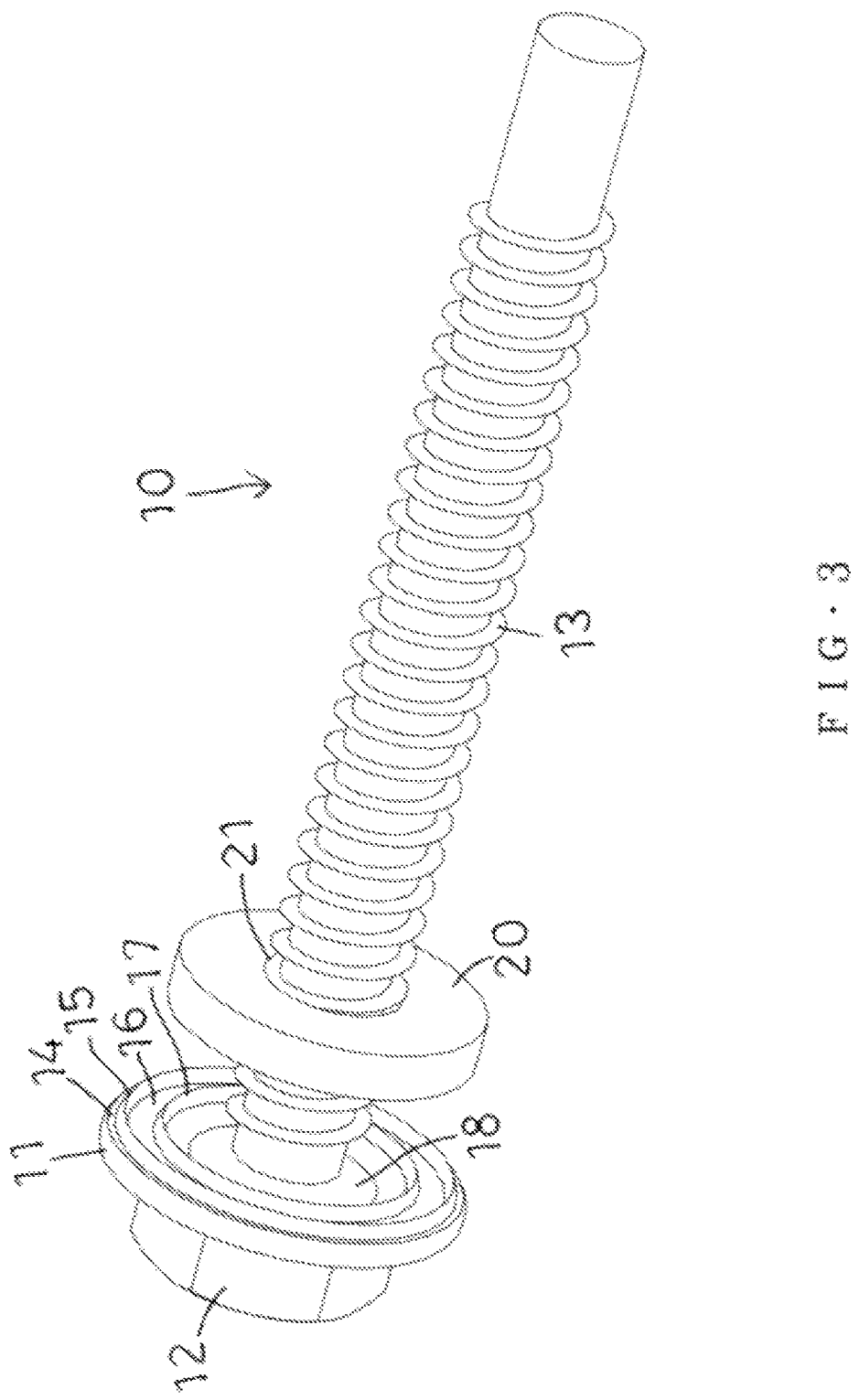
FIG. 3 is a perspective view of a screw assembly in accordance with the preferred embodiment of the present invention.
Figure 4:
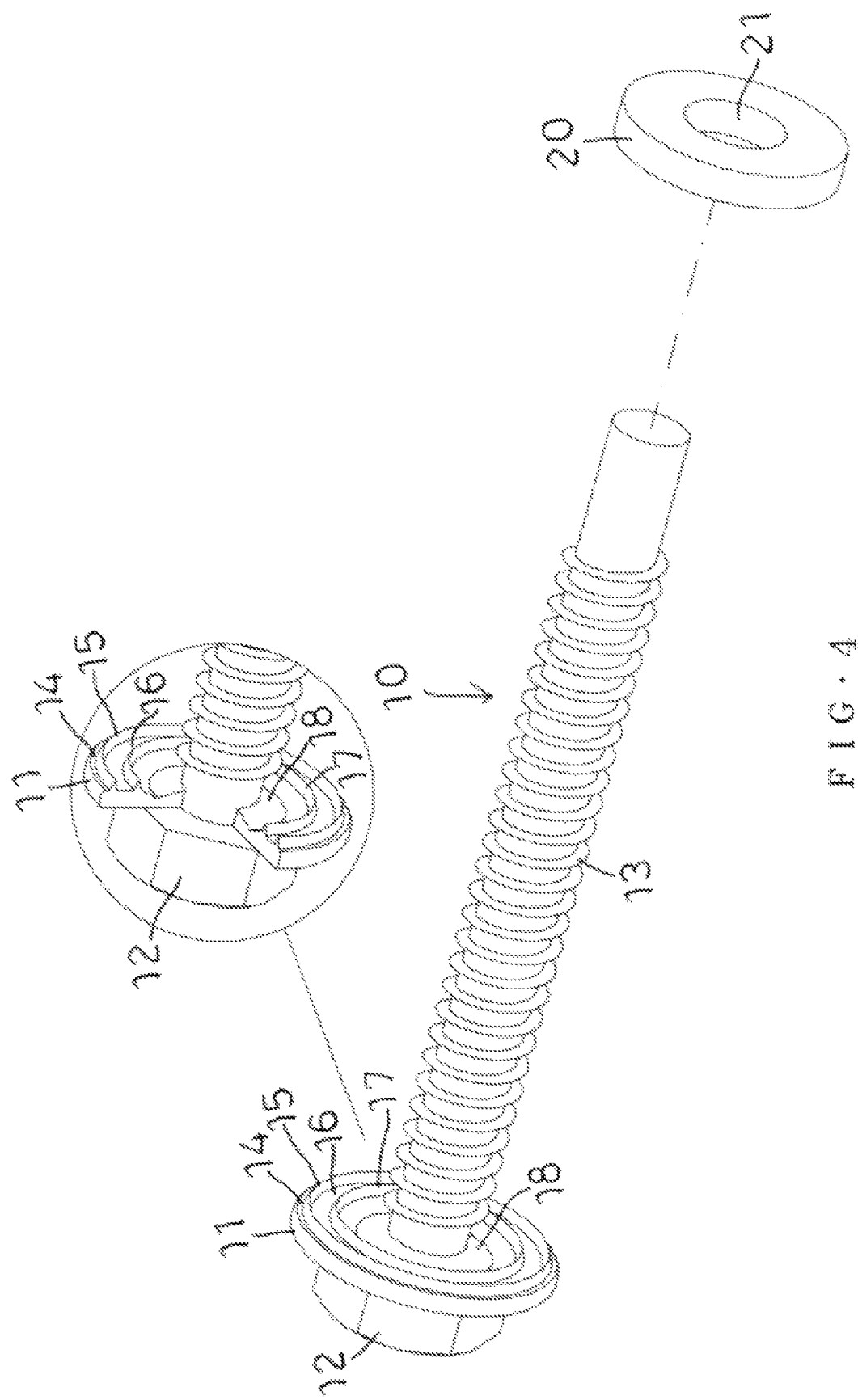
FIG. 4 is an exploded perspective and locally enlarged view of the screw assembly in accordance with the preferred embodiment of the present invention.
Figure 5:
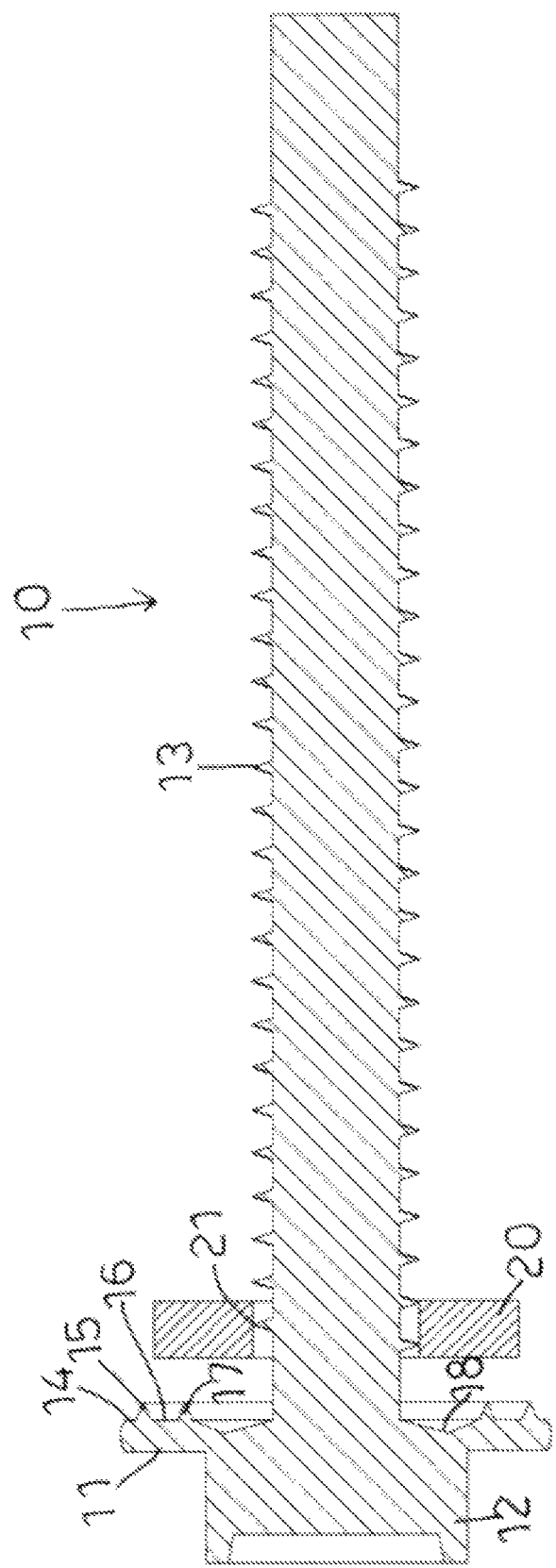
FIG. 5 is a cross-sectional view of the screw assembly as shown in FIG. 3.

Referring to the drawings and initially to FIGS. 3-5, a screw assembly in accordance with the preferred embodiment of the present invention comprises a screw 10 and a washer 20 mounted on the screw 10.

The screw 10 includes a screw head 11, a rotation portion 12 formed on the center of a top of the screw head 11, and an external thread 13 formed on the center of a bottom of the screw head 11. A driving tool is mounted on the rotation portion 12 to drive the rotation portion 12 which is driven to rotate the screw 10. The bottom of the screw head 11 is provided with a first plane 14, a first projection 15, a second plane 16, and a second projection 17. The first projection 15 is located between the first plane 14 and the second plane 16, and the second plane 16 is located between the first projection 15 and the second projection 17. The first projection 15 surrounds the second projection 17. The bottom of the screw head 11 is provided with a recessed portion 18 which is arranged between the rotation portion 12 and the external thread 13. The second projection 17 is located between the second plane 16 and the recessed portion 18, and surrounds the recessed portion 18.

The washer 20 is made of resilient material. The washer 20 has a center provided with a through hole 21 mounted on the external thread 13 of the screw 10.

Figure 6:
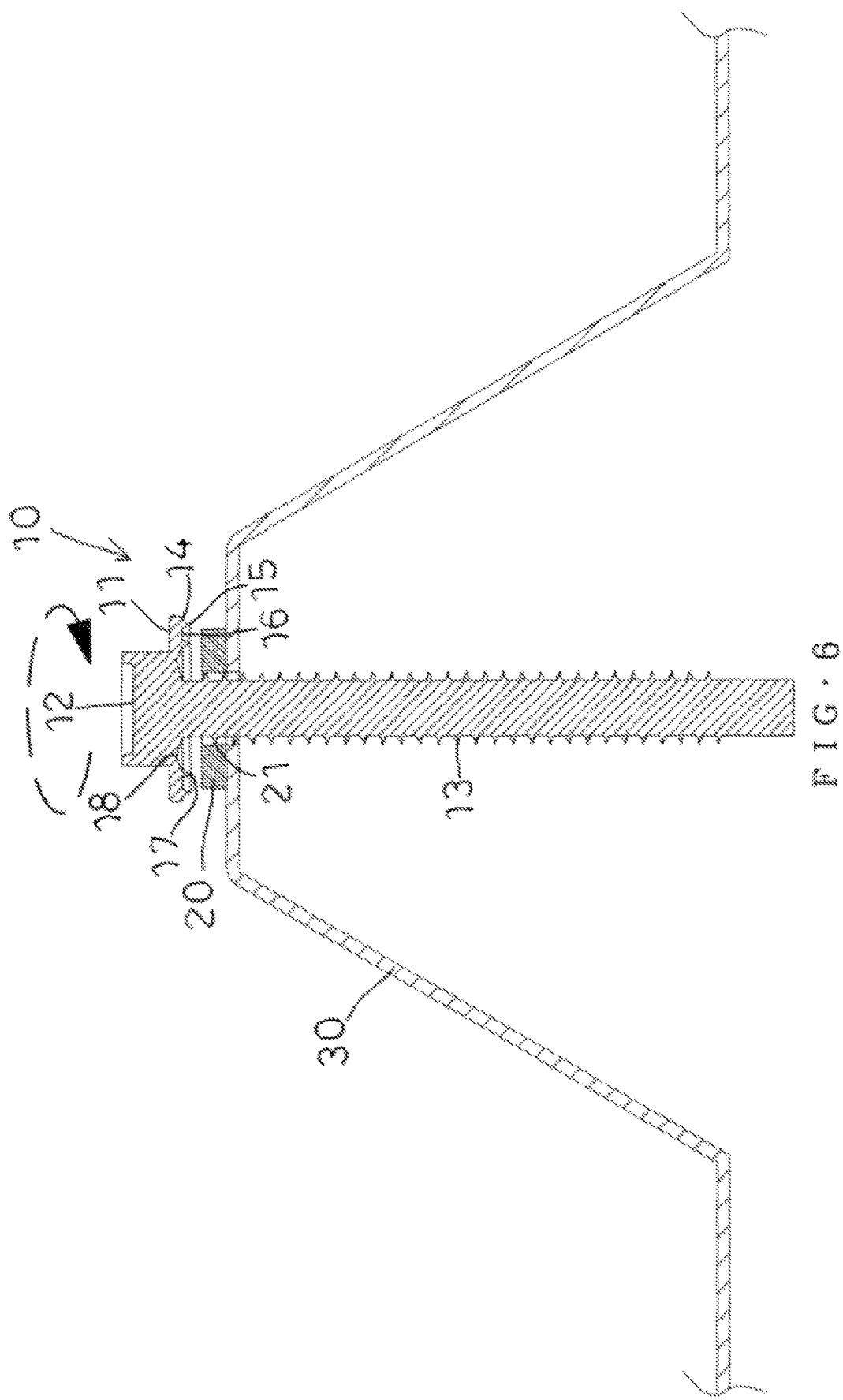
FIG. 6 is a cross-sectional operational view of the screw assembly in accordance with the preferred embodiment of the present invention.
Figure 7:
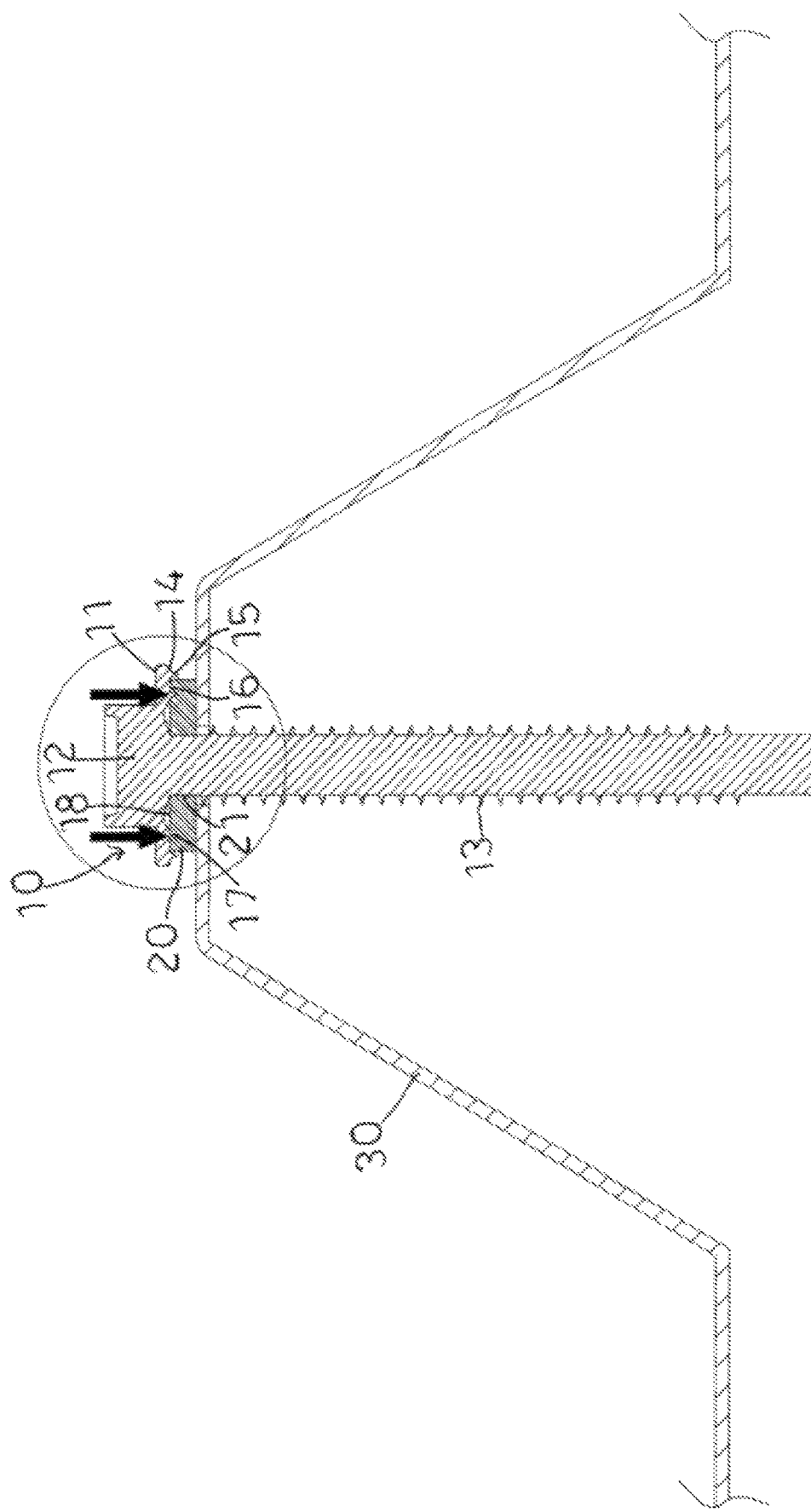
FIG. 7 is a schematic operational view of the screw assembly as shown in FIG. 6.
Figure 8:
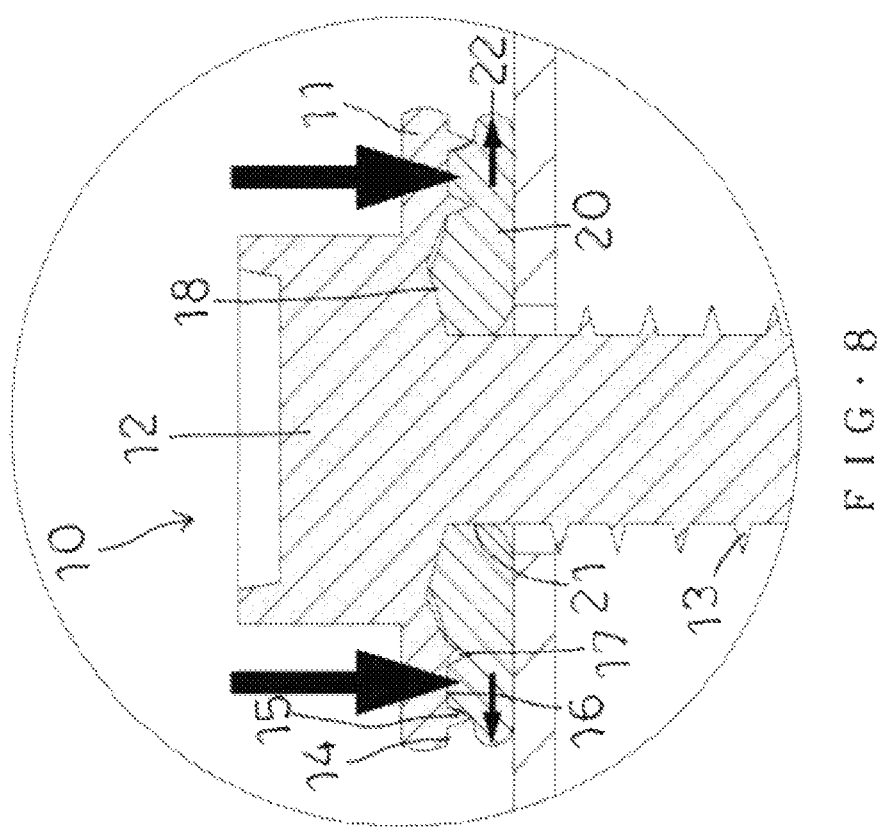
FIG. 8 is a locally enlarged view of the screw assembly as shown in FIG. 7.
Figure 9:
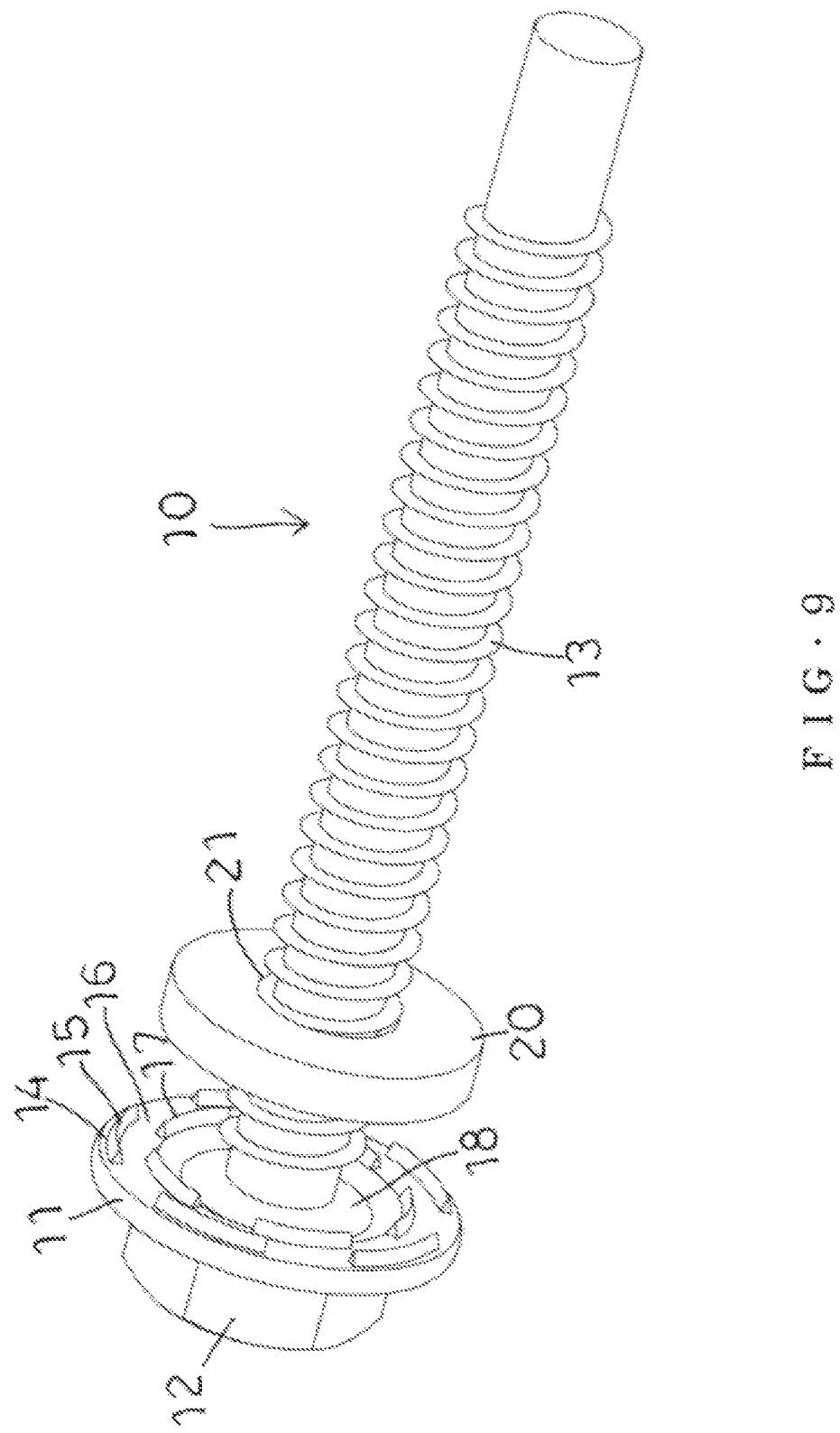
FIG. 9 is a perspective view of a screw assembly in accordance with another preferred embodiment of the present invention.
Figure 10:
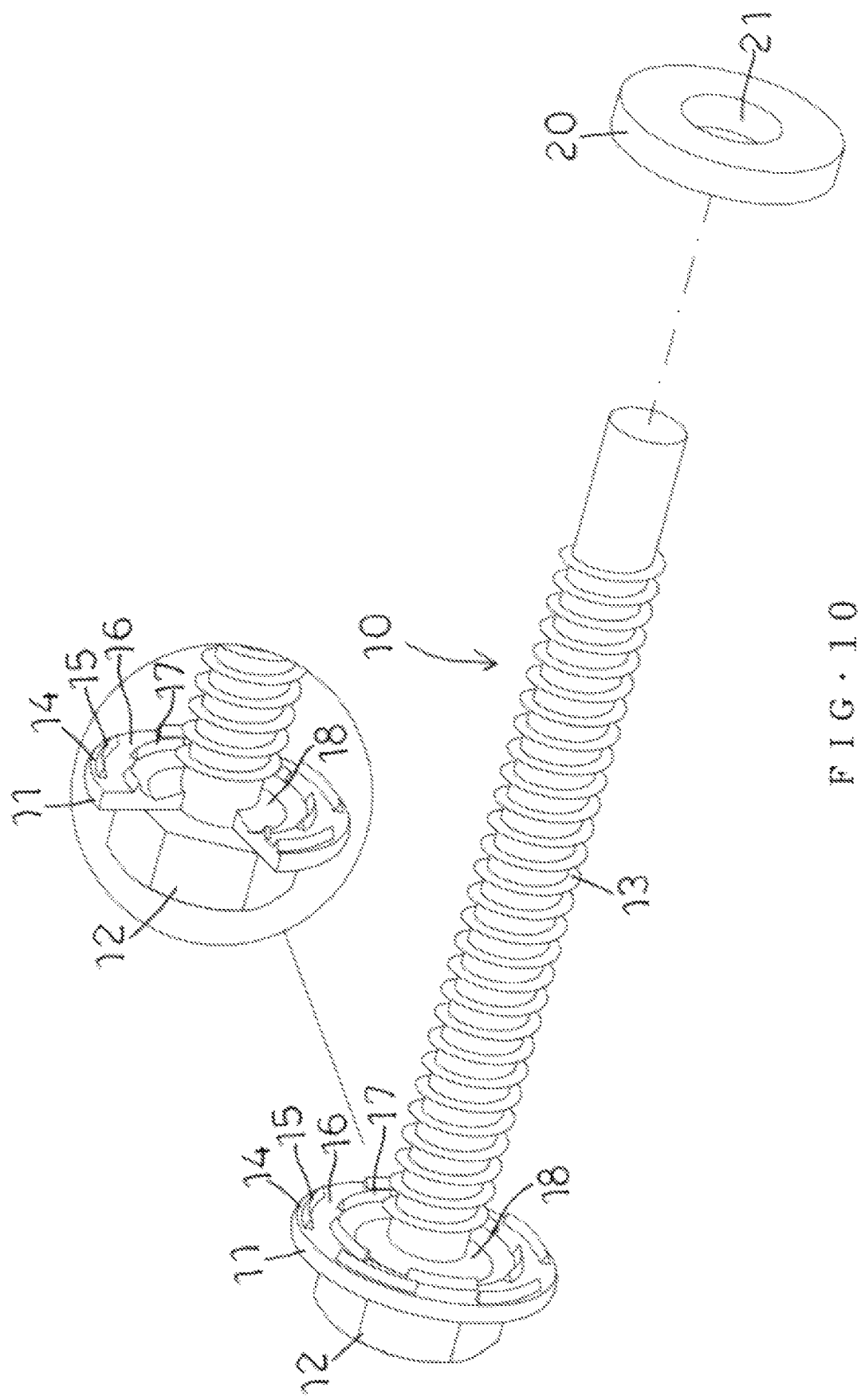
FIG. 10 is an exploded perspective and locally enlarged view of the screw assembly as shown in FIG. 9.

In operation, referring to FIGS. 6-8 with reference to FIGS. 3-5, when the rotation portion 12 is rotated as shown in FIG. 6, the screw 10 is rotated, and the external thread 13 is screwed into an article 30 which is preferably a corrugated board for baking paint (or baking finish). When the screw head 11 touches and presses the washer 20, the washer 20 is compressed between the screw head 11 and the article 30 as shown in FIG. 7, such that the washer 20 is expanded outward and forms an expansion 22 as shown in FIG. 8. At the same time, the washer 20 is deformed elastically and expanded upward, such that the washer 20 has a surface filled in the recessed portion 18 of the screw 10 as shown in FIG. 8. In addition, the first projection 15 and the second projection 17 of the screw 10 engage the surface of the washer 20. In such a manner, when ambient air or liquid permeates through the screw head 11, the first projection 15, the second projection 17, and the recessed portion 18 of the screw 10 construct a corrugated successive closed area, to prevent the ambient air or liquid from entering the inner face of the article 30, to achieve an airtight purpose. Thus, the screw 10 enhances the airtight effect of the article 30 greatly.

In the preferred embodiment of the present invention, the rotation portion 12 of the screw 10 has a hexagonal shape, a plum blossom shape or a circular shape.

In the preferred embodiment of the present invention, the bottom of the screw head 11 is integrally formed with the first projection 15, the second projection 17, and the recessed portion 18.

In the preferred embodiment of the present invention, the first projection 15 is formed on an outer circumference of the bottom of the screw head 11, and the second projection 17 is formed on an inner circumference of the bottom of the screw head 11.

In the preferred embodiment of the present invention, the first projection 15 and the second projection 17 have a successive shape. Preferably, the first projection 15 and the second projection 17 have an annular shape.

In the preferred embodiment of the present invention, the first projection 15, the second projection 17, and the recessed portion 18 press the washer 20 simultaneously when the washer 20 is compressed between the screw head 11 and the article 30 to enhance the airtight effect.

Referring to FIGS. 9-12, the first projection 15 is divided into a plurality of first sections, and the second projection 17 is divided into a plurality of second sections. The first sections of the first projection 15 and the second sections of the second projection 17 are arranged at an alternating or staggered state as shown in FIG. 12.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A screw assembly comprising:
   a screw; and
   a washer mounted on the screw;
   the screw includes a screw head, a rotation portion formed on a top of the screw head, and an external thread formed on a bottom of the screw head;
   the bottom of the screw head is provided with at least one projection and at least one recessed portion;
   when the external thread is screwed into an article, the washer is compressed between the screw head and the article;
   the at least one projection and the at least one recessed portion press the washer, and the washer is expanded outward and forms an expansion;
   the at least one projection and the at least one recessed portion enhance an airtight effect of the washer;
   the at least one projection includes a first projection and a second projection;
   the first projection is divided into a plurality of first sections;
   the second projection is divided into a plurality of second sections; and
   the first sections of the first projection and the second sections of the second projection are arranged at an alternating state.

2. The screw assembly of claim 1, wherein the rotation portion of the screw has a hexagonal shape, a plum blossom shape or a circular shape.

3. The screw assembly of claim 1, wherein:
   the first projection is formed on an outer circumference of the bottom of the screw head; and
   the second projection is formed on an inner circumference of the bottom of the screw head.

4. The screw assembly of claim 1, wherein the washer is made of resilient material.

5. The screw assembly of claim 1, wherein the bottom of the screw head is integrally formed with the at least one projection and the recessed portion.

* * * * *